United States Patent

[11] 3,589,399

| [72] | Inventor | Roger Vignes |
| | | Paris, France |
| [21] | Appl. No. | 881,524 |
| [22] | Filed | Dec. 2, 1969 |
| [45] | Patented | June 29, 1971 |
| [73] | Assignee | Gar De France, Paris, France |
| [32] | Priority | Dec. 3, 1968 |
| [33] | | France |
| [31] | | 176453 |

[54] COCK OR VALVE FOR CONTROLLING THE WORKING CONDITIONS OF A GAS HEATING APPARATUS
10 Claims, 4 Drawing Figs.

| [52] | U.S. Cl. | 137/625.3 |
| [51] | Int. Cl. | F16k 11/08 |
| [50] | Field of Search | 137/625.28, .32 |

[56] References Cited
UNITED STATES PATENTS

| 2,631,811 | 3/1953 | Malloy | 137/625.31 X |
| 2,765,809 | 10/1956 | Lamar | 137/625.3 X |
| 2,765,810 | 10/1956 | Bergquist | 137/625.12 |
| 2,911,008 | 11/1959 | Du Bois | 137/625.31 |
| 3,014,489 | 12/1961 | Lamp et al. | 137/625.31 X |
| 3,146,794 | 9/1964 | Hollman | 137/625.3 X |

Primary Examiner—Henry T. Klinksiek
Attorney—Nolte and Nolte

ABSTRACT: The invention relates to a cock for controlling a gas heating apparatus such as a cooker. The cock comprises a body in which is formed a first arcuate groove which communicates with the gas supply conduit, and an opening which communicates with the gas distribution conduit, a disc mounted opposite the said body and in which is formed a second arcuate groove and a washer mounted between the body and the disc and in which are provided calibrated orifices. According to the position of rotation of the cock, a certain number of said orifices interconnect said gas supply conduit to said second gas conduit.

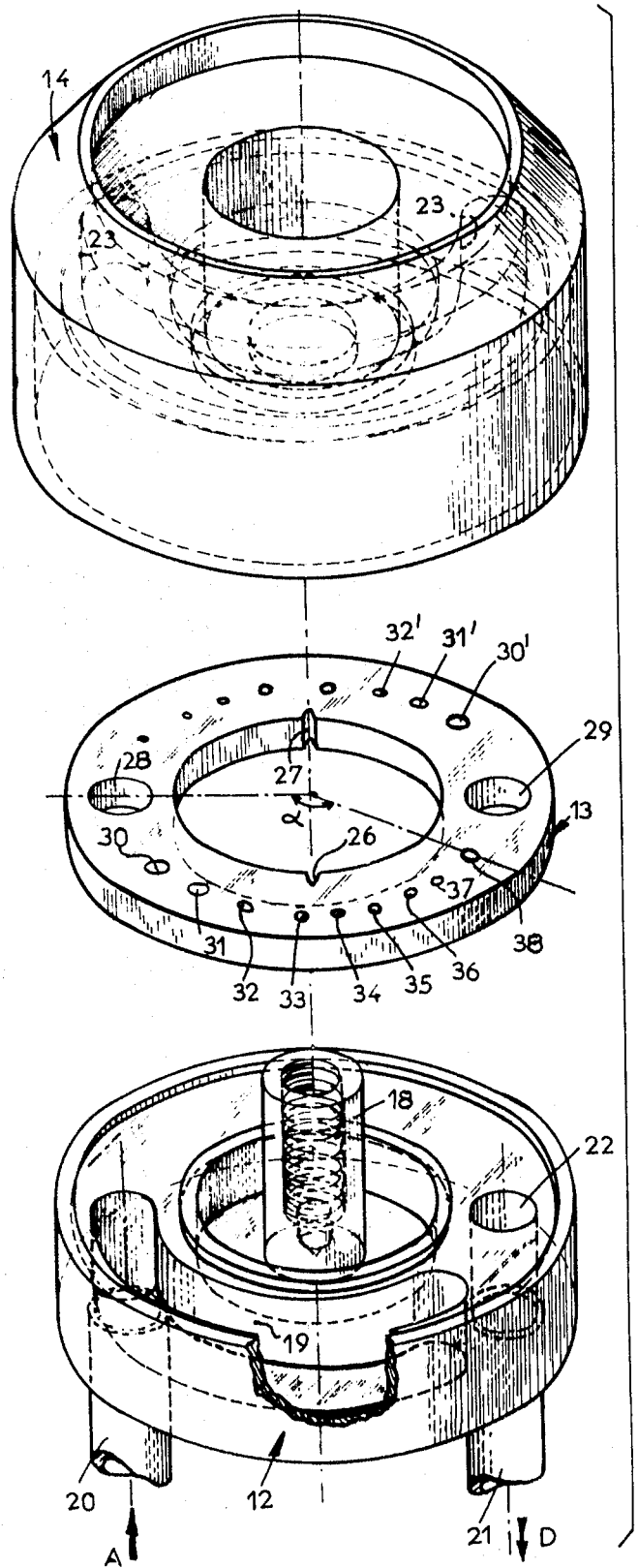

PATENTED JUN29 1971

INVENTOR
ROGER VIGNES

BY *Nolle & Nolle*
ATTORNEYS

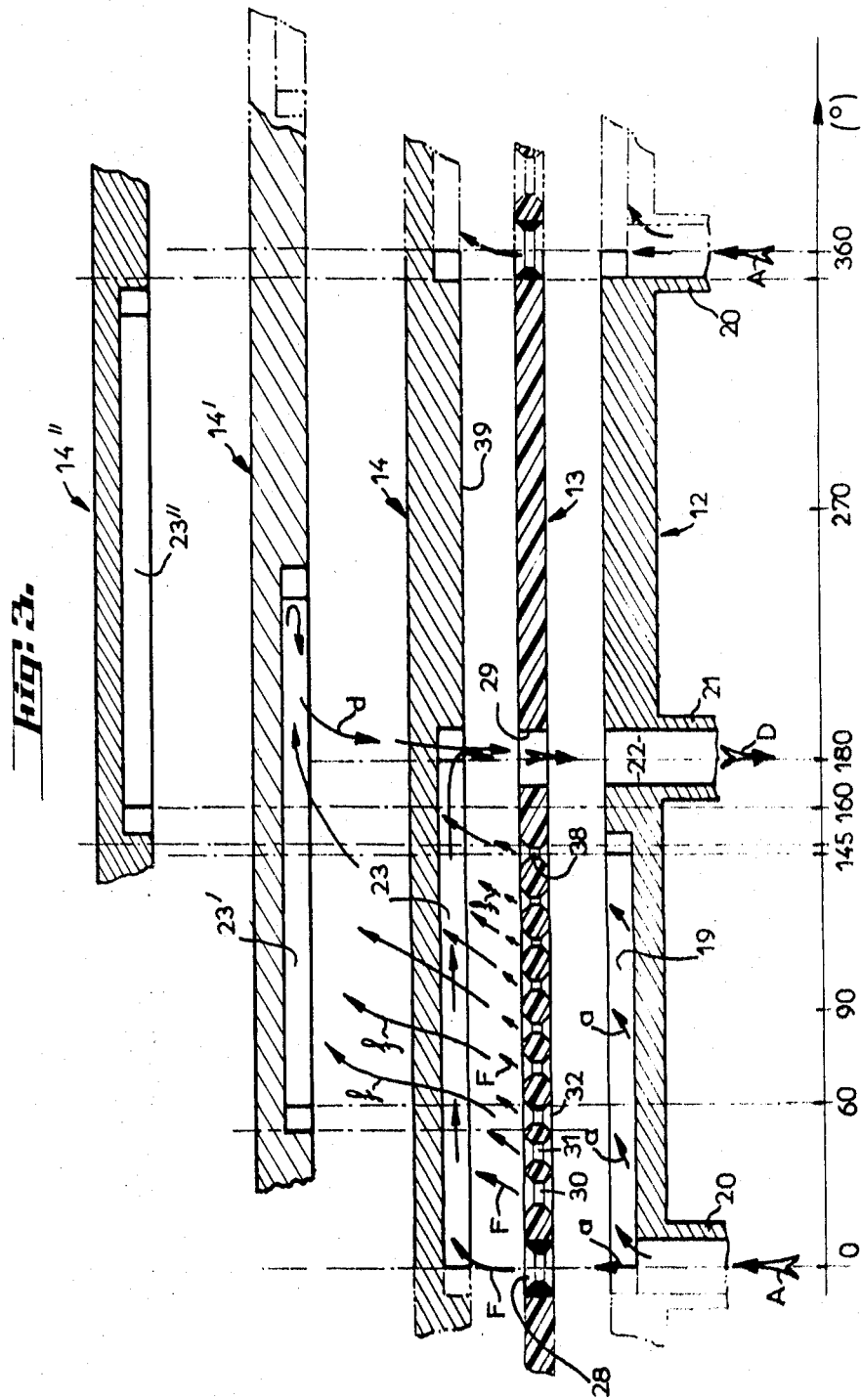

COCK OR VALVE FOR CONTROLLING THE WORKING CONDITIONS OF A GAS HEATING APPARATUS

The present invention has essentially for its object a cock or valve for controlling the working conditions of a gas heating apparatus and in particular of a gas stove or cooker which is mounted between a supply conduit and a distribution conduit. The supply conduit is connected to any desired supply source such as a mains network or pressurized combustible gas bottle and the distribution conduit distributes the gas to the burner.

In known apparatus there are essentially two types of cocks or valves.

The first type of cock or valve used is a rotary plug cock. In such cocks there is provided a taper cock-body pierced transversely with two mutually confronting orifices in which rotates a plug having a corresponding taper and provided with corresponding orifices. Depending on the angular position of the plug in the cock-body a more or less large passageway is left.

The major drawback of this type of cocks or valves consists in that they are not very accurate and that the control of the flame at the burner is difficult under such conditions.

The second type of cocks or valves used is the needle type valve. In these valves a needle screw is adapted to be applied progressively on a seat so as to laminate or throttle more or less a gas flow passing between the seat and the head of the needle screw. These valves are accurate enough. Unfortunately they are very delicate and if a certain control reliability and a suitable sensitivity are to be obtained, it is necessary to sufficiently reduce the control ratio to enable control by giving the valve more than one turn.

Alongside with the drawbacks just mentioned there appears a major drawback of another nature: depending on the kind of supply the combustion characteristics are basically different.

In particular, the calorific or heating values of the gases may range from 4,500 mth/m.$^3$ for town gas to about 28,300 mth/m.$^3$ for butane gas, including a 10,000 mth/m.$^3$ value approximately for natural gas.

Likewise, supply pressures vary from a mains network pressure value to pressure values of independent supplies from compressed gas bottles. The viscosities of the gases used also vary considerably.

It follows that even if, in the best case, a plug type or a needle-type valve or cock may be substantially satisfactory for a given type of supply, it is in most cases necessary, if the kind of supply is to be modified, to change also the whole cock or valve.

The cost of such a transformation is of course not negligible. Moreover, the results obtained are not very satisfactory and, in particular, the control is not very accurate and reliable.

The invention has for its purpose to obviate all the aforementioned drawbacks by creating a cock or valve of a novel type which is at the same time economical, affords very accurate control, is sensitive, foolproof and adaptable very easily and practically without expenses for any contemplated type of supply.

A cock or valve according to the invention, enabling to achieve these aims, is remarkable notably in that it comprises a body in which is formed a first groove substantially in the shape of an arc of a circle which communicates with a first conduit, e.g. the gas supply conduit, and an opening which communicates with the second conduit, i.e. the distribution conduit, a disc mounted opposite the said body and in which is formed a second groove substantially in the shape of an arc of a circle, and a washer or ring mounted between the body and the disc and in which are provided calibrated orifices, a certain number of which, i.e. a number varying with the positions of rotation of the cock or valve, interconnect the said first and second grooves, while simultaneously the second groove and the said second conduit or distribution conduit communicate with one another.

According to a preferred embodiment, the arrangement is so designed that the said washer or ring is fixedly mounted on the said body, the said orifices are arranged in steps circularly opposite the said first groove, an orifice is formed in the washer or ring opposite the said conduit distributing the gas to the burner, and the disc rotates relative to the washer or ring and to the body, the said second groove being located, depending on the open positions of the cock or valve, on the one hand opposite the said orifice formed in the said washer or ring opposite the gas distribution conduit, and on the other hand opposite a more or less large number or none of the said calibrated orifices.

In this manner, the cock or valve allows the passage, depending on its open position, of a gas flow which is, at every moment, equal to the sum of the flows passing through a certain number of said calibrated orifices. It is understood that in this manner the control is both accurate and reliable.

For instance, in one form of embodiment, by providing for instance ten such calibrated orifices arranged in steps, one may obtain ten regularly stepped heating conditions, so as to obtain flows ranging from 1 to 16 for instance according to a constant-ratio geometrical progression, said constant-ratio being in this particular case equal to 1.36.

At the same time, when it is desired to replace one supply source by another having different characteristics, it will be sufficient, in order to adapt the cock valve for its new use, to modify the calibration of the calibrated orifices. This modification may be obtained for instance by simply changing the washer or ring. Since the latter is advantageously made from any appropriate material enabling to avoid the risk of seizing or jamming of the cock or valve, such as for instance teflon, the modification is very economical.

Besides, according to a modified form of embodiment, one and the same washer or ring may be used simply by way of angular shifting or turning over to enable the use of a supply of another type. For instance such washers or rings may be provided to be used in one position to enable supply with town gas, and in another position to enable butane gas supply.

Advantageously the cock or valve is so designed that total control of the various working or heating conditions is achieved by diving the cock or valve less than one turn.

Also, the cock or valve is advantageously so designed that the removal and the replacement of the washer or ring in which are formed the calibrated orifices may be simply carried out for instance by unscrewing a simple central screw on the front of the cock or valve, so as to avoid the necessity of removing the band of the stove or cooker, or of the heating apparatus equipped with the said cock or valve.

The invention will appear more clearly from the following description of one form of embodiment given solely by way of example and illustrated in the appended drawings wherein:

FIG. 1 is an exploded perspective view of the whole cock or valve;

Figure 4:
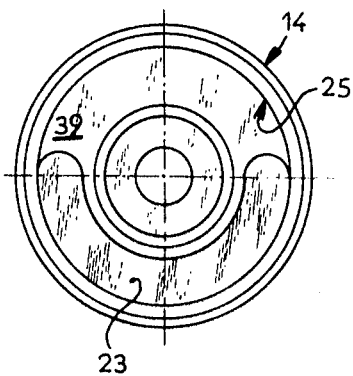

FIG. 3 diagrammatically illustrates the control of the flow allowed to pass through the cock or valve depending on the various angular positions of its control knob;

FIG. 4 is a view from below, to a smaller scale, of the control knob.

According to the form of embodiment illustrated, the cock or valve 10 according to the invention, which may be mounted for instance on the band 11 of a stove or cooker, is composed essentially of a base body 12, a washer or ring 13 and a control disc-knob 14, the washer or ring 13 being confined between the body 12 and the knob 14. The parts just mentioned are assembled for instance through the medium of a spring 15 which presses the knob 14 on the washer or ring 13 and therefore applies the latter on the body 12, the said spring being retained by a washer 16 and a screw 17 screwed into a central pivot pin 18 provided on the body 12. A cover 40 protects the assembly.

In the body 12 is formed a first groove 19 substantially in the shape of an arc of a circle which communicates with a conduit 20, which is for instance the gas feed conduit. A second conduit 21, which in this case is the gas distribution conduit, communicates with an opening 22 formed in the body 12 and substantially in diametral alignment with the location where the conduit 20 opens into the groove 19. In the form of embodiment illustrated the groove 19 extends over an arc of substantially 145° to 155°.

In this manner, the knob 14 of the cock or valve is formed with a second groove 23 substantially in the shape of an arc of a circle having the same radius of curvature as the groove 19, extending over substantially 180°, the two grooves 19 and 23 being turned opposite one another.

As previously mentioned, between the body 12 and the knob 14 is mounted a washer or ring 13 advantageously made from Teflon. The washer or ring 13 is sealingly mounted in the body 12 and in the knob 14 in abutment against the respective annular passage walls 24, 25. Orifices are formed in the washer or ring 13.

In the form of embodiment illustrated, the ring 18 is held against rotation on the body 12, for instance by means of keying or fixing projections engaged in slots 26, 27 of the ring 13.

When the ring 13 is in mounted position, an orifice 28 is located opposite the conduit 20 and an orifice 29 is located opposite the conduit 21.

In addition to the orifices 28, 29, a certain number of calibrated orifices 30 to 38 are arranged by steps circularly on the said ring. The spread $\alpha$ of the angle passing through the orifice 28 and the orifice 38 is advantageously substantially the same as that of the groove 19.

The operation of the device will now be described by referring more particularly to FIG. 3.

Figure 2:
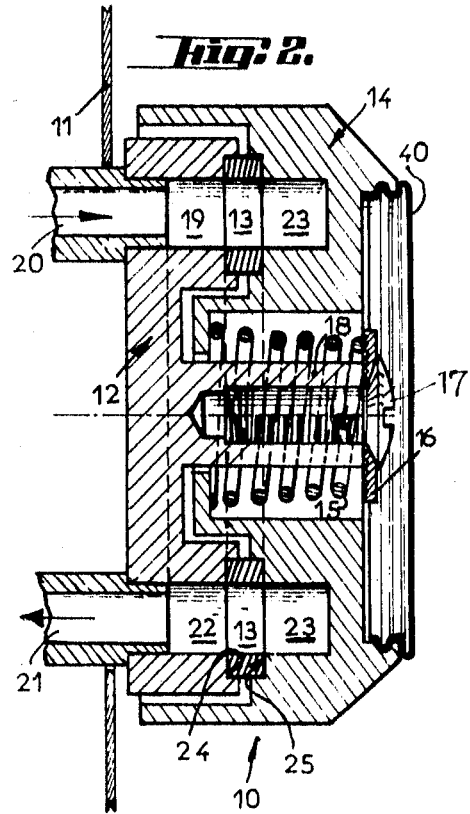
FIG. 2 shows the cock or valve in mounted position on the stove or cooker band.

In this figure there is shown a diagrammatic and developed view of three positions of the cock or valve, i.e. more specifically three different angular positions of the knob 14 relative to the whole of the body 12 and the ring 13. In this Figure the angular coordinates of the various points of the three parts 12, 13, 14 are plotted on the axis of abscissas, the origin 0° of which is taken to be the axis of the supply conduit 20. At 14, 14' and 14" there are shown three positions of the knob, the position 14 corresponding to the fully open position of the cock or valve (FIG. 2) the position 14' to an intermediate open position and the position 14" to the closed position.

1. Fully open position.

The combustible supply gas proceeding from the conduit 20 in the direction of the arrow A diffuses and circulates in the groove 19 in the direction of the arrows $a$. It then passes through the various orifices 28, 30 to 38 and flows out in the direction of the arrows F to penetrate into the groove 23 which is then located opposite all these orifices in the position shown at 14 of the control knob of the cock or valve. The gas flow collected in the groove 23, which is equal to the sum of all the flows having passed through the orifices 28, 30 to 38, retraverses the ring 13 bypassing through the orifice 29 and therefrom flows out in the direction of the arrow D by passing through the orifice 22 towards the distribution conduit 21.

2. Intermediate position.

When the cock or valve 14 is turned to be brought to the position 14' after a rotation for instance on the order of 60°, it is seen that in this position the orifices 28, 30 and 31 are no longer located opposite the groove 23 which has been displaced to 23'.

Under such circumstances the gas flow collected in the groove 23' is no longer equal to the sum of the gas flows passing through the successive calibrated orifices 32 to 38 (in the direction of the arrows $f$). This collected flow flows back in the direction of the arrow $d$ through the orifices 29 and 22 towards the distribution conduit 21 as previously.

3. Closed position.

When the control knob of the cock or valve is brought to the position 14" (rotation on the order of 150° approximately), it is seen that in this position none of the orifices 28, 30 to 38 is located opposite the groove 23". Under such circumstances, the gas flow passing through the cock or valve is zero.

Advantageously the diameters of the calibrated orifices are arranged in steps so as to obtain a gradual or progressive control of the heating conditions.

For instance, an arrangement may be selected wherein each rotation through a given angle (on the order of 15° approximately in the example illustrated) bringing into play an additional calibrated orifice, multiplies the total flow by a constant factor $x$.

Otherwise stated, if the cross section of flow through the calibrated orifice of the rank $i$ be denoted by $S_i$, a relation of the following type is selected:

$$\sum_0^i S_i = x \sum_0^{i-1} S_{i-1}$$

For instance if ten calibrated orifices be selected as shown in the drawing and $x=1.36$, then the following distribution is obtained:

| $i$ | 1 | 2 | 3 | 4 | 5 | 6 | 7 | 8 | 9 | 10 |
|---|---|---|---|---|---|---|---|---|---|---|
| $\sum_0^i S_i$ | 1 | 1.36 | 1.85 | 2.52 | 3.42 | 4.7 | 6.4 | 8.7 | 11.8 | 16 |
| $S_i$ | 1 | 0.36 | 0.49 | 0.65 | 0.9 | 1.23 | 1.67 | 2.37 | 3.1 | 4.2 |

It is seen that with such an arrangement, one may pass very gradually or progressively from an initial unit flow to sixteen times this flow with a constant rate of progression equal to 1.36 for each successive rotation through 15° of the control knob of the cock or valve.

In the preferred example of embodiment described hereinabove, it will be noted that the control of the cock or valve is performed in less than one turn.

Such an arrangement is advantageously used by providing in the ring 13 another set of calibrated orifices 30', 31', 32' etc. having different sections and adaptable for another type of supply. Thus, in case of a change of supply, it will be sufficient to unscrew the screw 17, remove the knob 14, turn the ring 13 through 180° and then replace the knob 14, and the cock or valve will thus be suitable for a new type of supply (after having removed the cap or cover 40).

Advantageously, as shown in the drawings, the surfaces of the calibrated orifices, are milled at least on the bottom 39 of the passage wall 25 so as to avoid obturation or deformation of the said orifices as a result of friction and progressive wear of the ring 13 against the knob 14.

Of course the invention is by no means limited to the form of embodiment described and illustrated, as the latter has been given by way of example only. In particular, it is possible to select different series or sets of calibrated orifices with different angular spacings of the ring 13. Control by means of the cock or valve may be obtained by using various angular displacements. In the described example this displacement was shown to be on the order of 180°, but this of course is not limitative. Likewise, the structure of the cock or valve may be reversed, the ring being for instance stationary relative to the knob and movable with respect to the body. Also, the feed and distribution conduits may be interchanged. It is therefore understood that the invention comprises all technical equivalents to the means described as well as their combinations, should the latter be carried out according to its spirit.

What I claim is:

1. A cock for controlling the operating conditions of a gas heating apparatus interconnecting a supply conduit and a distribution conduit, comprising a body in which is formed a first groove substantially in the shape of an arc of a circle which communicates with a first aforesaid conduit, and an opening which communicates with the second aforesaid conduit, a disc mounted opposite the said body and in which is formed a second groove substantially in the shape of an arc of a circle, and a washer mounted between the body and the disc and in which are provided calibrated orifices, a variable number of which according to the positions of rotation of the cock, interconnect the said first and second grooves, while simultaneously the second groove and the said second gas conduit communicate with one another through an orifice provided in said washer opposite said second gas conduit.

2. A cock according to claim 1, wherein the said first and second grooves are centered on the axis of rotation of the cock, have the same mean radius of curvature and the said calibrated orifices as well as the conduit distributing the gas to the burner are centered on the cylinder whose axis is the axis of rotation of the cock and whose radius of curvature is the said mean radius of curvature.

3. A cock according to claim 2, wherein the washer is fixedly mounted on said body, the said calibrated orifices are arranged in steps circularly opposite the said first groove, and the disc turns with respect to the washer and to the body, the said second groove being located, depending on the open positions of the cock, on the one hand opposite the said orifice formed in the said washer opposite said second conduit, and on the there hand opposite a more or less large number or none of tee said calibrated orifices according to the position of rotation of the cock.

4. A cock according to claim 3, wherein said washer is mounted in circular passages formed on the faces opposite the disc and the body ensuring the fluid tightness of the assembly.

5. A cock according to claim 3, wherein the said first groove extends over an angle on the order of 140° to 150°, the said second groove extends over an angle substantially equal to 180°, the gas supply and distribution conduits in the body are diametrally opposed, and at least one series of calibrated orifices are formed in the said washer, are shifted angularly and extend over an angle substantially equal to the opening angle of the said first groove.

6. A cock according to claim 5, wherein the successive calibrated orifices have decreasing surfaces.

7. A cock according to claim 5, wherein two symmetrical sets of calibrated orifices with different openings are provided in the washer.

8. A cock according to claim 3, wherein the disc is formed in the control knob of the cock.

9. A cock according to claim 3, wherein the disc is resiliently pressed against the washer through the medium of resilient means and of a central screw screwed in a central pivot pin provided on the base body and forming an axis of rotation for the disc.

10. A cock according to claim 6, wherein the cross section of flow of the first calibrated orifice corresponding to the minimum gas flow fed to the burner is notably superior to that of at least the adjacent calibrated orifice.